(12) United States Patent
Mueller et al.

(10) Patent No.: US 8,381,888 B2
(45) Date of Patent: *Feb. 26, 2013

(54) POWER TRANSMISSION DEVICE

(75) Inventors: Bruno Mueller, Sasbach (DE);
Thorsten Krause, Buehl (DE);
Christian Huegel, Rheinau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 589 days.

This patent is subject to a terminal disclaimer.

(21) Appl. No.: 12/571,749

(22) Filed: Oct. 1, 2009

(65) Prior Publication Data

US 2010/0084238 A1    Apr. 8, 2010

(30) Foreign Application Priority Data

Oct. 2, 2008  (DE) .......................... 10 2008 050 284

(51) Int. Cl.
*F16H 45/02* (2006.01)

(52) U.S. Cl. ..................................... 192/3.3; 192/85.25

(58) Field of Classification Search ............... 192/85.25, 192/106 F, 3.29, 3.3
See application file for complete search history.

(56) References Cited

U.S. PATENT DOCUMENTS

| | | | | |
|---|---|---|---|---|
| 4,957,195 A | * | 9/1990 | Kano et al. ................. | 192/106 F |
| 5,172,799 A | * | 12/1992 | Iijima et al. ................. | 192/106 F |
| 5,421,439 A | * | 6/1995 | Hayasaki .................... | 192/85.25 |
| 5,662,198 A | * | 9/1997 | Kojima et al. ............ | 192/48.611 |
| 7,036,646 B2 | * | 5/2006 | Yabe et al. ................. | 192/106 F |
| 2007/0181396 A1 | * | 8/2007 | Maienschein et al. ....... | 192/3.29 |
| 2007/0235277 A1 | * | 10/2007 | Heuler et al. ................... | 192/3.3 |
| 2009/0014274 A1 | * | 1/2009 | Schneidewind ................ | 192/85 |
| 2010/0038201 A1 | * | 2/2010 | Mueller et al. ............... | 192/3.29 |

FOREIGN PATENT DOCUMENTS

| | | |
|---|---|---|
| DE | 44 33 256 A1 | 5/1995 |
| DE | 102006028557 A1 | 1/2007 |

* cited by examiner

*Primary Examiner* — Richard M. Lorence
*Assistant Examiner* — Lillian Nguyen
(74) *Attorney, Agent, or Firm* — Simpson & Simpson, PLLC (57) ABSTRACT

A power transmission device for power transmission between an engine and a power output, comprising at least an input and an output, a hydrodynamic component with an impeller and a turbine wheel and a device for partially bypassing at least the hydrodynamic component with a servo unit featuring a piston element that can be pressurized with hydraulic medium and able to influence the circulation rate difference of flow media on both sides of the piston element, wherein the influence comprises rotary synchronism with the piston element of the servo unit, a further rotatable piston element disposed in axial direction with a spacing from the piston element of the servo unit.

18 Claims, 5 Drawing Sheets

POWER TRANSMISSION DEVICE

CROSS-REFERENCE TO RELATED APPLICATIONS

This patent claims priority of German Patent Application No. 10 2008 050 284.7, filed on Oct. 2, 2008, which application is incorporated herein by reference.

FIELD OF THE INVENTION

The invention relates to a power transmission device, in particular, for transmission of power between an engine and a power output, comprising at least an input and an output, a hydrodynamic component, a device for partially bypassing at least the hydrodynamic component with a servo unit featuring a piston element that can be pressurized with a hydraulic medium and having means for influencing the rotation speed difference of flow media on both sides of the piston element, comprising a hydrodynamic component and a device for partially bypassing at least the hydrodynamic component.

BACKGROUND OF THE INVENTION

A power transmission device comprising a hydrodynamic rotation speed/torque converter and a bypass clutch, for instance, is anticipated from the document DE 44 33 256 A1. The power transmission device comprises an input that is connected non-rotatably with an engine. For instance, this is formed by housing with at least a wall extending more or less radially. The lock-up clutch disposed between the latter and the turbine wheel of the rotation speed/torque converter comprises at least a disc in rotary connection with the turbine wheel, which, on the one hand, can be brought into active connection with the housing and, on the other hand, with a piston that can be axially displaced and that is disposed between housing and turbine wheel, under the effect of hydraulic pressure on the latter. A chamber that can be pressurized in the first place with the hydraulic medium that serves for closing the clutch is provided between the piston and turbine wheel. A first chamber, for closing the lock-up clutch, which can be pressurized with the hydraulic medium, is provided between the piston and housing wall.

A second chamber, which can be pressurized with hydraulic medium, is provided between piston and turbine wheel, wherein this pressure chamber also comprises the impeller, stator and turbine wheel. Moreover, this pressure chamber is provided with two connections and cooling oil can circulate through this pressure chamber. In this way, in the first and second chamber to be pressurized with the hydraulic medium, means of reducing the rotation speed difference are provided between the prevailing low circulation rate of flow medium with an open or slipping lock-up clutch, in the dragging mode, inside the pressure chamber, between the turbine, piston and the higher circulation speed of the flow medium that prevails in the pressure chamber between the piston and housing. This is realized, for instance, by the radial-inward extension of the lock-up clutch discs with the blade-type form.

To improve the actuation of the lock-up clutch, means for the reduction of the rotation speed difference is known from DE 10 2006 028 557 A1, according to an embodiment in which the piston element of the actuation device of the lock-up clutch can be connected non-rotatably by means of a coupling spring device; however, it is movable in axial direction with the housing and features a flow-guide means that influences the rotation speed of the flow medium between the piston and the turbine wheel through which a rapid increase of the circulation speed of the flow medium should be targeted between the piston and the turbine wheel and hence the dynamic pressure at the beginning of the lock-up clutch actuation.

Generally, however, the problem exists in the application in vehicles, with regard to the ability to implement clean and jerk-free adjustment of the lock-up clutch, due to the hydrodynamic influences of flow media.

BRIEF SUMMARY OF THE INVENTION

The invention is based on the task to further develop a power transmission device of the kind mentioned above, in which a further improvement of the actuation behavior of a lock-up clutch can be attained with particularly simple means, especially in a configuration with an actuation device that can be exposed to arbitrary pressure, as well as a reduction of the hydrodynamic influences on the lock-up clutch that can lead to automatic closure of the latter.

A power transmission device executed according to the invention, in particular for power transmission between an engine and a power output, comprising at least an input and an output, a hydrodynamic component with an impeller and a turbine wheel and a device for partially bypassing at least the hydrodynamic component, with a servo unit featuring a piston element that can be pressurized with hydraulic medium, and with means for influencing the circulation rate difference of flow media on both sides of the piston element, wherein the means comprises rotary synchronism with the piston element of the servo unit, a further rotatable piston element being disposed with a spacing in axial direction from the piston element of the servo unit.

The solution according to the invention enables effective shielding, of the piston element of the servo unit of the shiftable clutch device, from axial forces resulting from hydrodynamic effects, in particular through extension of the support of axial forces from the piston element of the servo unit resulting from the hydrodynamic effects on another element in the form of a further piston element with simple means, free from additional modification demand for individual subassemblies.

The other piston element can be executed in different ways. What is decisive is the flow medium provided in the space between the latter and the piston element of the servo unit, which causes a dragging effect, thus the circulation rate of the flow medium in this range is reduced during the deceleration mode or increased during the drag mode by up to the rotation speed of the piston element of the servo unit of the shiftable clutch device.

A multiple number of possibilities exist with respect to the structure of the power transmission device. This can be executed at least as a dual- or as a triple channel unit. This comprises at least two connections, the first connection coupled with a work chamber of the hydrodynamic component and the second connection limited by the housing and the external circumference of the hydrodynamic component and a connection coupled with a chamber that can be filled with operating medium. In the embodiment as a triple channel unit, a further—third—connection is assigned to the piston element and coupled with a chamber that can be pressurized with hydraulic medium, wherein the piston element at the input or an element connected non-rotatably with the latter, is guided in a pressure- and liquid-tight manner or the piston pressure chamber is not enclosed by sealing elements, and the piston element is likewise activated by flow reversal and is only enclosed depending on the application of the friction lining.

Depending upon the embodiment of the power transmission device, there are different possibilities of arrangement for a further piston element acting as a centrifugal-oil piston. In this way, the centrifugal-oil piston, in a first embodiment, viewed in axial direction, between the input and output, can be disposed between the piston element of the servo unit of the shiftable clutch device and the turbine wheel of the hydrodynamic component. If an apparatus for damping vibrations is provided, which, when viewed in axial direction between the input and output, is disposed between the piston element and the turbine wheel of the hydrodynamic components, then the other centrifugal-oil piston element, viewed in axial direction, between the input and output, preferably is disposed between the piston element and the apparatus for damping vibrations or also between the apparatus for damping vibrations and the turbine wheel of the hydrodynamic component. These arrangements are generally not associated with additional assembly space requirement in axial direction, wherein the assembly space at disposal in axial direction for is sufficient for the function of a further piston element acting as a centrifugal-oil piston.

To facilitate the synchronism of rotation speed, the other piston element acting as a centrifugal-oil piston is connected non-rotatably with the piston element of the servo unit of the shiftable clutch device or an element connected non-rotatably with the latter, preferably movably in axial direction and supported on a connection element in the axial direction. Depending upon the input embodiment of the power transmission device, this can be a component connected non-rotatably with the latter or also the output or a component connected non-rotatably with latter. Through the support on a connection element formed by an arbitrary component of the power transmission device with exception of the piston element of the servo unit itself, or the piston element of the servo unit of the shiftable clutch device can be free without bearing axial forces. The piston element acting as a centrifugal-oil piston is thereby in a particularly advantageous embodiment connected non-rotatably with a shiftable clutch device with the piston element of the servo unit or coupled with the hub centering the latter and also born by the latter.

The input of the power transmission device or an element coupled non-rotatably with the latter acts as a connection element in a first embodiment. In accordance with a second embodiment, an element that can rotate with a speed relative to the centrifugal-oil piston, in particular the output of the power transmission device or an element coupled non-rotatably with the output of the power transmission device acting as connection element.

The input of the power transmission device can be formed by a housing bell enclosing at least the power transmission device and a wall formed by the latter or coupled non-rotatably with the latter. The elements coupled non-rotatably with the latter involve preferably a hub connected non-rotatably with the latter, on which also the piston element of the servo unit is guided in a shiftable manner in axial direction or is centered on the latter. The support in axial direction can be provided directly on this element that is coupled non-rotatably with the input of the power transmission device. Preferably, stop limits formed in axial direction, for instance, in the form of circlips are used for introducing the axial force into the connection element.

In contrast, the second embodiment is characterized in that the axial support owing to the partially occurring relative speeds cannot occur directly on the connection element, but by corresponding means in the form of bearing devices that allow a relative movement. Plain- or roller bearings, for instance, find application as bearing devices. The use of support rings formed as bearing discs is also possible.

There are numerous possibilities with respect to the embodiment of a non-rotatable connection between the piston element acting as a centrifugal-oil piston and the piston element of the servo unit. These can be formed as force- or form-closed elements. In this way, in accordance with a first embodiment, form- or force-closure can be generated directly between the piston element and centrifugal-oil piston, wherein this can occur in the area of the internal- or external circumference. In accordance with a second embodiment, the rotational pulling occurs by means of frictional grip, for instance, through the axial contact of a spring unit relative to the connection element.

There is a plurality of possibilities with regard to the arrangement of the non-rotatable connection. These, depending on the embodiment, can be disposed in different radial areas of the piston element of the servo unit and of the piston element acting as a centrifugal-oil piston.

To be able to realize essentially equal ratios on both sides of the piston, the piston element in the form of a disc-shaped element extends in radial direction by forming an axial interstice that is essentially preferably characterized by the same gap geometry as that of the chamber that can be pressurized with hydraulic medium. To ensure the filling of the interstice with operating medium and passage or rather circuit of the operating medium, in particular a cooling circuit, a hydrodynamic connection with the rest of the internal chamber of power transmission device is required. This is preferably realized in a connection area of the piston element. Depending on a tight connection of the piston element in its external- or internal circumference area, the hydrodynamic connection occurs either in the latter area or in radial direction in the opposite area. In this way, also the means of non-rotatable connection to the overflow area can be used.

In a particularly advantageous embodiment, the second connection of the power transmission device is disposed in the interstice area on the internal chamber of the power transmission device.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
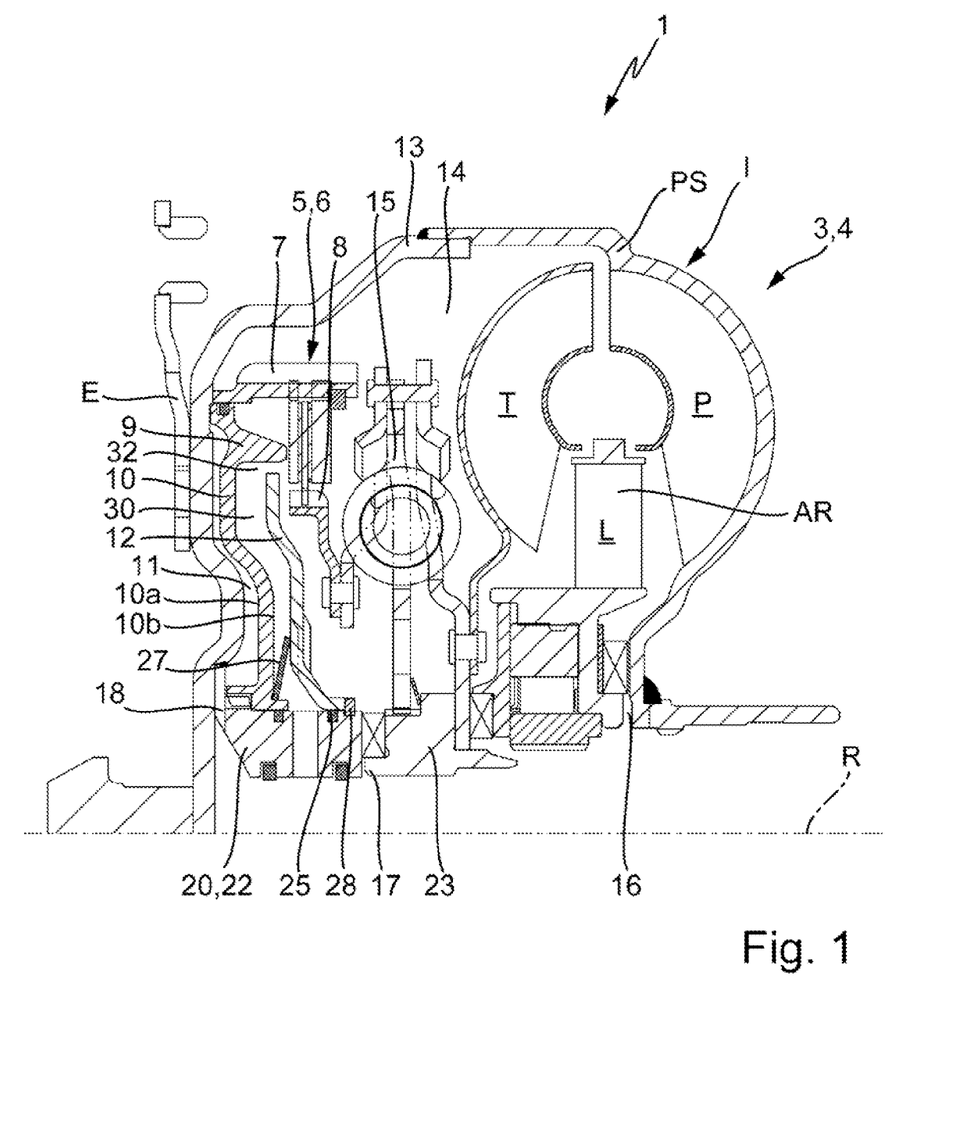
FIG. 1 is an axial cross-section illustrating a first embodiment of the power transmission device with centrifugal-oil piston element integrated according to the invention and an axial support on the input of the power transmission device.

FIG. 1 clarifies, in a schematic simplified depiction in an axial section, power transmission device 1, formed according to the invention, for the application in drive trains, in particular drive trains of vehicles between an engine and a power output. The output is generally formed by transmission—not depicted here. Power transmission device 1 assumes the function of the power transmission as well as, to a certain extent, rotating speed-/torque conversion. Power transmission device 1 features at least input E and output A that is not depicted in FIGS. 1 to 3 in detail. Input E, in the process, can be coupled indirectly with at least an engine—not depicted here—whereas output A can be connected with an output, in general, the transmission downstream of power transmission device 1. Hydrodynamic component 3 is interposed between input E and output A. This comprises at least a primary wheel acting as impeller P for power transmission between input E and output A and a secondary wheel acting as turbine wheel T for power transmission from input E to output A, wherein impeller P, in this functional state, connected non-rotatably with input E, is preferably coupled non-rotatably with the latter or forms the latter. Moreover, turbine wheel T is at least connected indirectly with output A that implies either direct or indirect connection by means of further transmission elements. Output A, for instance, is formed by hub 23 that can be coupled with transmission input shaft 2 or depending upon the configuration also with transmission input shaft 2 itself. If hydrodynamic component 3 is formed as hydrodynamic circulation rate/torque converter 4, this further comprises at least of a reaction member in the form of stator wheel L. In this case, a circulation rate and torque conversion occurs concurrently by means of hydrodynamic component 3. In an embodiment as a hydrodynamic clutch, only speed conversion is possible freely without using a stator wheel.

Power transmission device 1 further comprises at least device 5 for at least partially bypassing hydrodynamic component 3, meaning—bypassing the power flow by means of the hydrodynamic component. Device 5 is executed as selectable clutch device 6 and is generally known as a lock-up clutch. "At least partial bypass" means that parallel power transmission can occur by means of both hydrodynamic component 3 and device 5. Device 5 is preferably formed as a frictional clutch. In the most common form, this is executed in the form of a disc clutch, in particular in the form of a wet-running disc clutch. Selectable clutch device 6 comprises first clutch part 7 and second clutch part 8 that can be brought in active connection with one another directly or indirectly by means of further transmission elements. In an embodiment as a frictional clutch, both clutch parts 7, 8 comprise at least one or several elements carrying frictional lining or forming frictional surfaces that are connected non-rotatably with the connection elements and can be brought together in active connection. Device 5 comprises servo unit 9, comprising piston element 10 that can be pressurized by means of chamber 11 that can be pressurized with hydraulic medium and is actuated by the same. Individual components are designed such that they can describe a power split, wherein the power split, depending on embodiment of device 5, in particular, for at least partial bypass, can be connected functionally in parallel or partially in series. First power split I is implemented by means of hydrodynamic component 3. In this way, impeller P is at least indirectly connected non-rotatably with input E of power transmission device 1 or it forms the latter. Preferably, the coupling occurs by means of housing cover 13 coupled non-rotatably with impeller P or formed on the latter as a single piece with impeller shell PS that encloses turbine wheel T and further selectable clutch device 6, in circumferential and axial direction, by forming internal chamber 14.

The output of hydrodynamic component 3 in power split I is formed by turbine wheel T and is connected non-rotatably with output A, either directly or by means of further transmission elements, for instance, in the form of an intermediate apparatus for damping vibrations that is exemplarily designated with 15 in this case.

Second power split II contains the power transmission from input E to the output A, when viewed through device 5 for at least partially bypassing the power flow by means of hydrodynamic component 3, wherein, here, preferably, the main area is characterized by complete bypass. The power transmission then occurs purely mechanically, free from power transmission by means of the hydrodynamic component. Device 5 and hydrodynamic component 3, in the depicted example, is connected downstream of apparatus 15 for damping vibrations in the power flow.

In the embodiment depicted in FIG. 1, a so-called triple-channel version of power transmission device 1 is involved. This is characterized by at least three connections. First connection 16 is thereby at least coupled indirectly with work chamber AR of hydrodynamic component 3, second connection 17 is connected at least indirectly, which implies that it is connected directly or indirectly by means of further elements with internal chamber 14, whereas third connection 18 is coupled with chamber 11 of servo unit 9 that can be pressurized with hydraulic medium. Depending on the actuation, a different flow direction of hydrodynamic component 3 can be realized by means of two connections 16 and 17, wherein, depending on the pressure ratios of hydrodynamic component 3 prevailing there, the passage either occurs centrifugally or centripetally. In both cases, the circulation inside work chamber AR is sustained, wherein also an external cooling oil flow can be sustained. In this way, an external circulation to the flow circulation inside work chamber AR adjusts outside the work chamber, through which, for instance, the operating medium of the hydrodynamic component is cooled for operating the latter, in particular, for power transmission, this occurs by means of hydrodynamic power split I. The connections 16 and 17 are thereby coupled with a pressure means supply and/or guide system—not depicted. This can be executed in many different ways. In addition, means for controlling the pressure ratios are provided on individual connections 16 and 17. Moreover, also connection 18 can be coupled with the same pressure medium supply- and/or guide system or with a separate system. It is desirable that the pressure in chamber 11 pressurized with hydraulic medium is freely adjustable, i.e. independently of the ratios in the remaining chambers.

Chamber 11 that can be pressurized with hydraulic medium is thereby limited by piston element 10, in that, it is coupled directly, preferably, pressure- and liquid tightly to input E, in particular, to housing cover 13 or to an element or input E directly coupled non-rotatably with the latter. Through this coupling, piston element 10 rotates with identical rotation speed to housing cover 13. If, now, in the non-actuated state of device 5, hydrodynamic component 3 is accelerated by the engine, a certain centrifugal-oil pressure adjusts between housing cover 13 and piston element 10 in dependence on the circulation rate and on the present pressure medium that, in case of inequality of the effective pressures acting on two face sides 10a and 10b of piston element 10, oriented in opposite directions to one another, and the presence of a resultant axial force Fresaxial leads to support of the resultant axial force on piston element 10, and this can cause a self-closing effect or even lead to selection problems of device 5. These centrifugal forces owing to the masses of the rotating operating media are more difficult to handle when the rotation speed ratios change between housing cover 13 and piston element 10 by the rotation speed of hydrodynamic component 3, in particular, on the turbine wheel T or when they even obtain different sign. This is always the case, in particular, when the circulation rate of the engine is increased or reduced or when the operating mode changes from tension- to shear operation mode. Therefore, further piston element 12 according to the invention is provided, which is formed preferably as a disc-like element and designated as a centrifugal-oil piston.

The other piston element 12 is disposed with spatial spacing in the axial direction, in the installation location, viewed between input E and output A of the power transmission device, when spatially displaced from piston element 10 of shiftable clutch device 6 and runs in rotary synchronism with piston element 10, through which the present operating medium is brought in place owing to dragging effects of the rotation speed of piston element 10 of the servo unit of shiftable clutch device 6, between piston element 10 and forming the other centrifugal-oil piston. This relates, in particular, to the operating medium around the piston element 10, inside internal chamber 14. The other piston element 12, forming the centrifugal-oil piston, extends in radial direction. Piston element 10 and the other piston element 12 are connected indirectly or directly with input E. Piston element 12 thereby is connected non-rotatably with piston element 10, according to one variant. The non-rotatable connection can be executed in different ways. Piston element 12 is born on a connection element in axial direction. This is designated with 22. With regard to the concrete embodiment of the non-rotatable connection between the other piston element 12, acting as a centrifugal-oil piston, and piston element 10 of servo unit 9, of shiftable clutch device 6, there are a variety of possibilities. In analog, this also applies to the axial support of the centrifugal-oil piston in axial direction.

Figure 2:
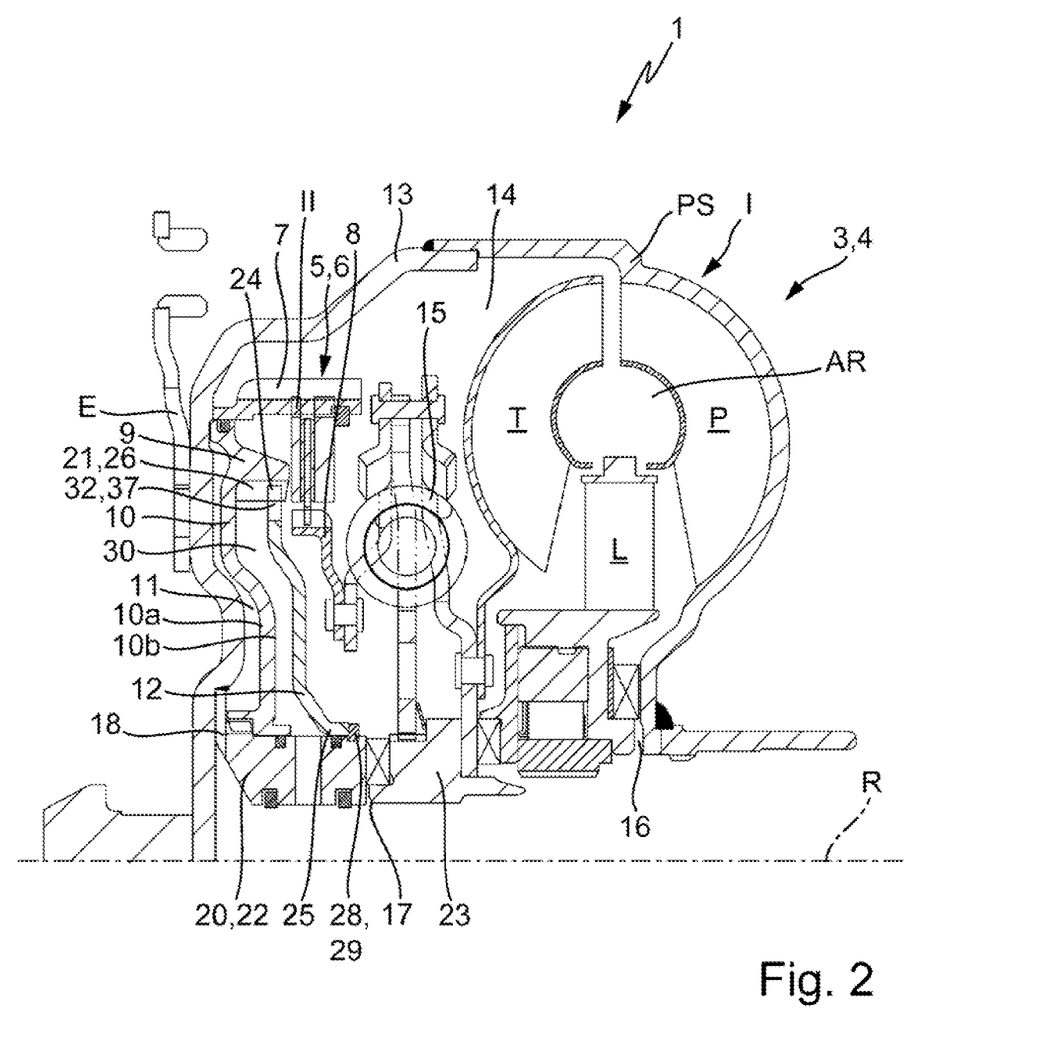
FIG. 2 is an axial cross-section illustrating a second embodiment of the power transmission device with centrifugal-oil piston element integrated according to the invention and an axial support on the input of the power transmission device.
Figure 3:
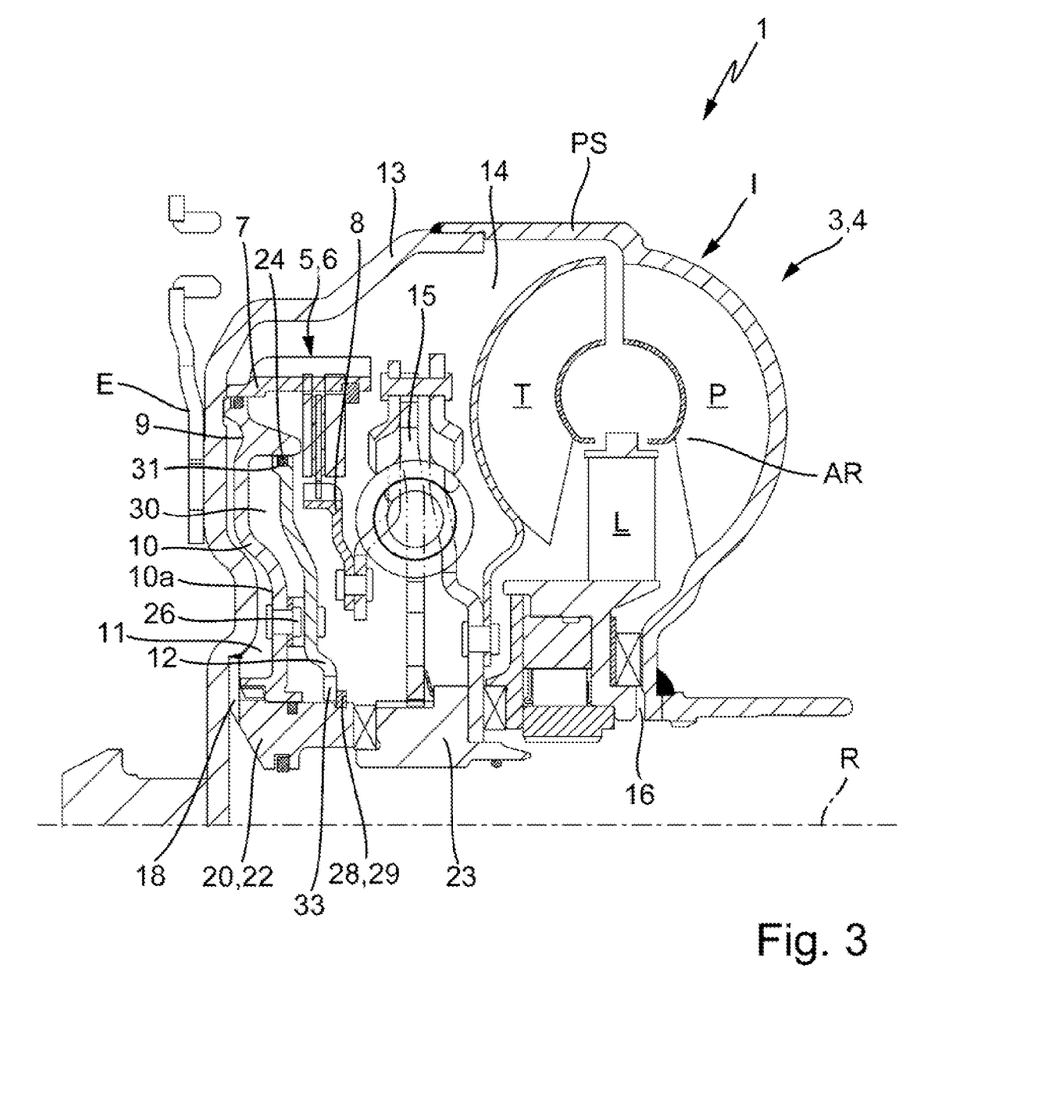
FIG. 3 is an axial cross-section illustrating a third embodiment of the power transmission device with centrifugal-oil piston element integrated according to the invention and an axial support on the input of the power transmission device.

FIGS. 1 to 3 thereby illustrate different design embodiments for implementing an axial support of piston element 12 acting as a centrifugal-oil piston on an element connected non-rotatably with input E of the power transmission device 1, in particular, of hub 20 connected non-rotatably with the piston element 10 of servo unit 9 of shiftable clutch device 6. Piston element 10 is guided in the embodiment depicted in FIG. 1 under the formation of chamber 11 on input E of power transmission device 1 that can be pressurized with hydraulic medium or an element forming the latter or coupled non-rotatably with the latter. In the depicted case, the guide is provided at least indirectly on housing cover 13, in particular, on first clutch part 7 connected non-rotatably with the latter, around the external circumference of piston element 10, and around the internal circumference on hub 20, connected non-rotatably with housing cover 13 that is also designated as piston hub. Piston element 10 is therefore coupled to input E of power transmission device 1 with regard to its rotation speed. Piston element 12 forming the centrifugal-oil piston is preferably connected non-rotatably with piston element 10 or hub 20 of servo unit 9, however, it is not supported in axial direction on piston element 10, but rather on input E or on input E connected non-rotatably with the latter, in particular hub 20. Piston element 12 acting as a centrifugal-oil piston is thereby centered on hub 20 and sealed against the latter by means of sealing device 25. The rotary pulling with piston element 10 of shiftable clutch device 6 or, if applicable, an element coupled non-rotatably with the latter, in particular hub 20, occurs by means of connection 26, comprising spring device 27 acting in the axial direction, which presses the piston element against limit stop 28 connected non-rotatably with hub 20, which is formed by spring ring 29. Also possible is a form-closed coupling between spring device 27 and piston element 12 acting as a centrifugal-oil piston. The resultant axial force on the piston element from chamber 11 and interstice 30 is born leftwards on housing cover 13 and rightwards on the frictional lining.

In this embodiment, connection 17 is displaced, in a particularly advantageous manner, in axial direction, near interstice 30 for coupling with internal chamber 14. In that way, the flow guide of the inlet or if applicable of the outlet operating medium can occur by means of this connection 17, which, depending on guide direction, is designated as cooling oil, directly into the chamber between piston element 10 of the servo unit and piston element 12 acting as a centrifugal-oil piston. An essential advantage of this embodiment is that the deaeration or if applicable aeration of this interstice 30 is ensured in any case.

FIG. 2 illustrates one embodiment that in basic design and function corresponds to that depicted in FIG. 1, with many of the same elements included and represented by the same reference numerals discussed above. However, the embodiment of FIG. 2 differs substantially in the implementation of non-rotatable connection 26 between the piston element 12 and piston element 10 of servo unit 9. Also here, piston element 12 acting as a centrifugal-oil piston is centered on hub 20 connected with housing cover 13 and is guided in the area of its internal circumference by forming a pair sealing against the latter by means of sealing device 25. The non-rotatable connection of piston element 12 with piston element 10 is not provided in this area, but rather provided around external circumference 24 of the other piston element 12 acting as a centrifugal-oil piston. This is provided by means of form-closed connection 21, in particular, in the form of interlocking toothed elements on a partial section forming an internal circumference of piston element 10 of servo unit 9 and on external circumference 24 of the other piston element 12. Also here, the resultant axial force of the centrifugal-oil pressure is born by element 12 on limit stop 28, in particular, in the form of spring ring 29. Through the disposition of the connection 17 in the axial direction in the area of the axial extension of interstice 30, it is also possible that the flow guidance of the inlet/outlet operating medium is provided directly by means of this chamber, through which deaeration as well as aeration of this space is ensured. Piston element 12, therefore, can extend essentially to the area around shiftable clutch device 6. It is decisive, however, that hydrodynamic connection 32 is provided between interstice 30 and internal chamber 14 created here by the size of connection 26. This requires that the other piston element 12 acting as a centrifugal-oil piston is not guided in a pressure- and liquid-tight manner on piston element 10 of servo unit 9 or on connection element 22 connected with the latter, but rather consists of hydrodynamic connection 32 between the interstice 30 and the rest of internal chamber 14 in this area.

In contrast to the embodiment in FIG. 2, FIG. 3 illustrates a third embodiment of the current invention, where power transmission device 1 with non-rotatable coupling of piston element 12 acting as a centrifugal-oil piston with piston element 10 of shiftable clutch device 6 and an axial support on input E of power transmission device 1, in particular, of hub 20 connected non-rotatably with the latter. In this embodiment, piston element 12 extends in radial direction to piston element 10, in particular, in a partial section forming an internal circumference. Piston element 12 is thereby guided in a sealing manner on piston element 10 of servo unit 9 in the area of its external circumference 24. For this purpose, at least sealing device 31 is provided between external circumference 24 of piston element 12 and a partial section forming an internal circumference of piston element 10. Moreover, the centering means of piston element 12 is provided preferably on piston element 10. The rotary pulling of piston element 12 acting as a centrifugal-oil piston and hence of non-rotatable connection 26 is provided here likewise by means of a leaf spring connection or a different connection. Connection 26 is disposed arbitrarily in radial direction based on piston element 12. The resultant axial force of the centrifugal-oil pressure is born here also on limit stop 28 in the form of spring ring 29 disposed on the external circumference of hub 20. Hydrodynamic connection 32 for the operating medium compensation between so-formed interstice 30 and the rest of internal chamber 14 is provided here by means of passage openings or cutouts 33 in piston element 12 in the area of its internal circumference. Connection 17 to the operating medium guide does not converge here into interstice 30 but rather in a different area inside internal chamber 14.

Figure 4:
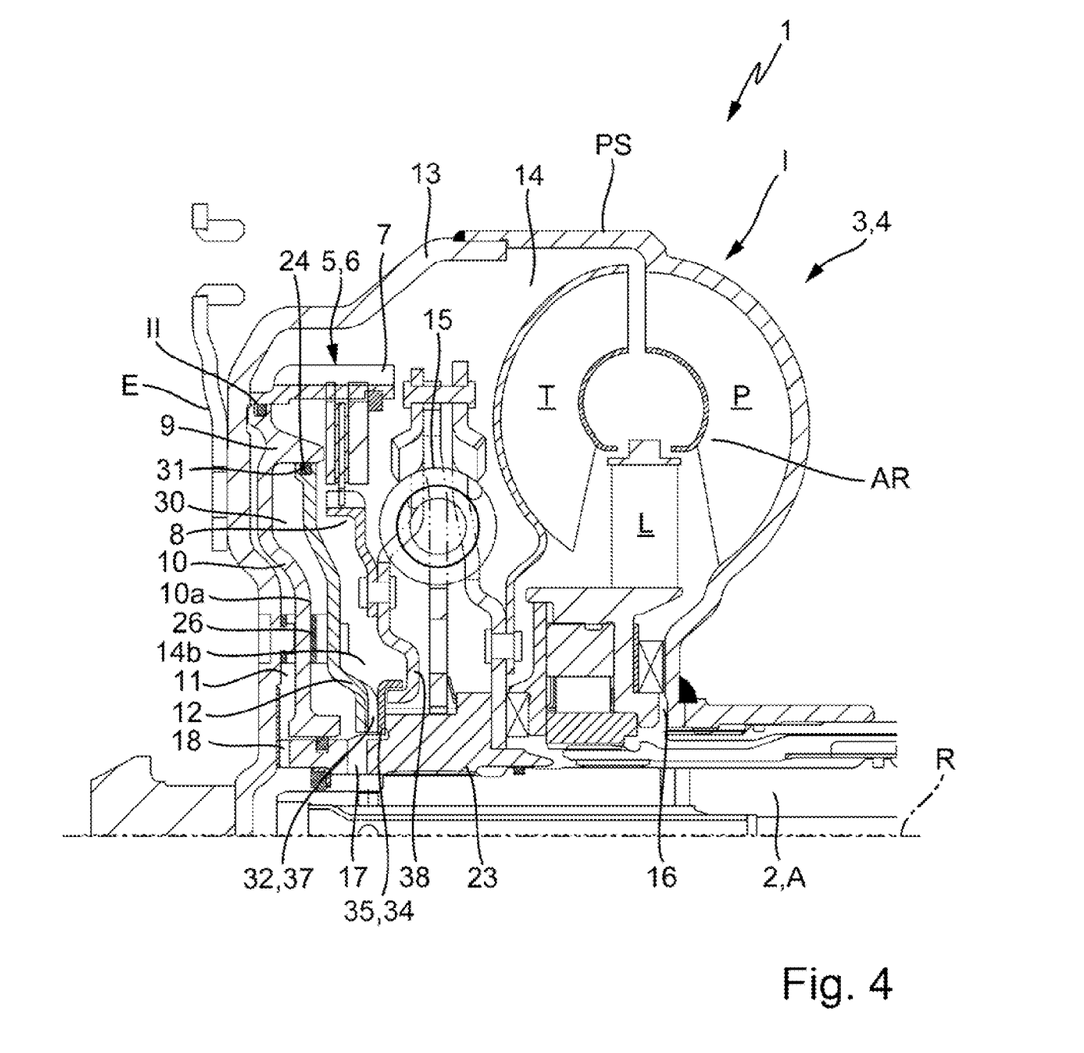
FIG. 4 is clarifies one embodiment of a power transmission device with an axial support on the output of the power transmission device; and, FIG. 5 clarifies a second embodiment of a power transmission device with an axial support on the output of the power transmission device.

In FIG. 4, one embodiment of power transmission device 1 is depicted here, supported by the other piston element 12, in particular, of the centrifugal-oil piston on output A of power transmission device 1. In this figure, piston 12 acting as a centrifugal-oil piston is likewise guided, in a sealing manner, on the area of its external circumference 24 on piston element 10 of servo unit 9 and, if necessary, it is guided on the latter. The rotary pulling of centrifugal-oil piston 12 with piston element 10 of servo unit 9 occurs, also, here by means of non-rotatable connection 26, in particular, leaf spring connection or a similar element. The axial force is born in the depicted case by axial bearing 35 on hub 23—executed as turbine wheel hub.

The hydrodynamic routing of the inlet/outlet operating medium must not occur here directly between piston element 10 and centrifugal-oil piston 12 and hence inside interstice 30. However, here also, connection 32 from interstice 30 has to be provided inside, as far as possible in radial direction, and the rest of internal chamber 14 of the clutch, also designated as clutch surrounding, for pressure compensation and hydrodynamic connection 32, in particular an inlet and an outlet for the operating medium. In this way, labyrinth seal 34 can be integrated against the pulling disc of the primary part of apparatus 15 for damping vibrations, further in respective axial bearing 35, in order to seal the clutch chamber directly against internal chamber 14. In this way, a targeted hydrodynamic routing for cooling purposes of shiftable clutch device 5 can be realized. Hydrodynamic connection 32 is formed by means of an interstice enclosed between the internal circumference of piston element 12 and the external circumference of hub 23 and preferably, grooves 37 aligned directly in the radial direction is disposed on piston element 12. This connects the part of internal chamber 14 designated with 14b and forming a pressure chamber 14b with interstice 30. Pressure chamber 14b is limited by piston element 12 and pulling element 38 of apparatus 15.

Figure 5:
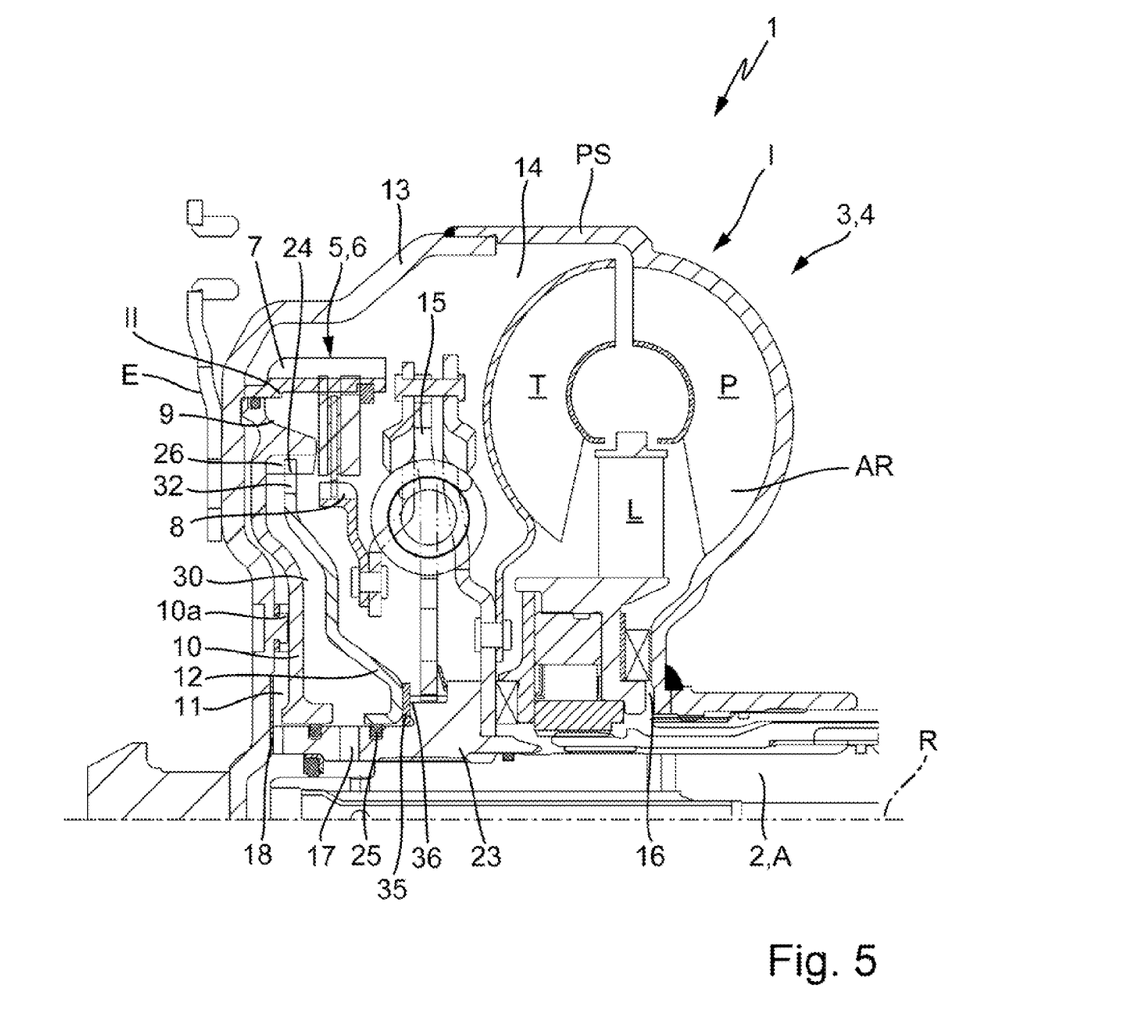

FIG. 5 illustrates one embodiment of power transmission device 1 with the support of piston element 12 acting as another centrifugal-oil piston on an element coupled with or forming output A of the power transmission device, here, of hub 23 executed as turbine wheel hub. In addition, in this embodiment, piston element 10 of servo unit 9 is guided, in a pressure-and-liquid tight manner between input E and output A of the power transmission device, on the latter and it is preferably connected non-rotatably with input E of the power transmission device, in particular, with housing cover 13. Between piston element 10 and turbine wheel hub 23, there is no non-rotatable connection. The other piston element 12 acting as a centrifugal-oil piston is connected non-rotatably with piston element 10 of servo unit 9. Connection 26 is provided here around the external circumference 24 of piston element 12, preferably by means of non-rotatable connection 26 in the form of a form-closed connection. The other piston element 12 is sealed against hub 23 in the area of its internal circumference, here, by means of sealing device 25, and it is born by turbine wheel hub 23 in the axial direction by means of axial bearing 35 on limit stop 36 that is formed by the turbine wheel hub itself. Axial bearing 35 is exemplarily formed by an intermediate disc, in particular, a back-up washer, a needle bearing or a plain bearing. The resultant axial force of the centrifugal-oil pressure is born likewise by means of this axial bearing 35 on the turbine wheel hub. The hydrodynamic routing of the inlet/outlet operating medium can occur directly in interstice 30 between piston element 10 of servo unit 9 and piston element 12 acting as a centrifugal-oil piston. The advantage is that also here, the de-aeration/aeration of this chamber is ensured. Thereby, connection 17 is coupled directly with this interstice 30. The transition, in particular, of hydrodynamic connection 32 to internal chamber 14 occurs around the external circumference, in particular, in the area of non-rotatable connection 26.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

List of Reference Symbols
1 power transmission device
2 transmission input shaft
3 hydrodynamic component
4 hydrodynamic circulation rate/torque converter
5 device for at least partial bypass
6 selectable clutch device
7 first clutch part
8 second clutch part
9 servo unit
10 piston element
10a face side
10b face side
11 chamber pressurized with hydraulic medium
12 piston element
13 housing cover
14 internal chamber 14b pressure chamber
15 apparatus for damping vibrations
16 connection
17 connection
18 connection
19 connection area
20 hub
21 form-closed connection
22 connection element
23 hub
24 external circumference
25 sealing device
26 non-rotatable connection
27 spring device
28 limit stop
29 spring ring
30 interstice
31 sealing device
32 hydrodynamic connection
33 recess
34 labyrinth seal
35 axial bearing
36 limit stop
37 groove
38 driving dog
I hydrodynamic split
II mechanical split
AR work chamber
L stator wheel
P impeller
T turbine wheel
R rotation axis

What we claim is:

1. A power transmission device (1) for power transmission between an engine and a power output, comprising:
   an input (E);
   an output (A);
   a hydrodynamic component (3);
   shiftable clutch device (6) for at least partially bypassing said hydrodynamic component (3) having:
      a first piston element (10), that can be pressurized with hydraulic medium; and
      a second rotatable piston element (12) disposed in an axial direction between said piston element (10) and the hydrodynamic component and connected to the first piston element such that rotation of the second piston element is locked to rotation of the first piston element, wherein:
         the first piston element is axially displaceable to open and close the shiftable clutch device; and,
         the second piston element remains free of contact with the first piston when the shiftable clutch device is closed.

2. The power transmission device (1) according to claim 1, wherein the second piston element (12) is supported in a shiftable manner in an axial direction of said power transmission device (1).

3. The power transmission device (1) according to claim 1, wherein the second piston element (12) forms a non-rotatable connection (26) indirectly or directly with the piston element (10) of the servo unit (9) of the shiftable clutch device (6) by means of other components or is connected non-rotatably with the latter element.

4. The power transmission device (1) according to claim 3, wherein the non-rotatable connection (26) is disposed between the first piston element (10) and the second piston element (12) in an area of an internal circumference of the second piston element.

5. The power transmission device (1) according to claim 3, wherein the second piston element (12) is connected non-rotatably with the input (E), by a hub (20).

6. The power transmission device (1) according to claim 3, wherein the non-rotatable connection (26) is disposed between the first piston element (10) and the second piston element (12) comprises a force-closed connection.

7. The power transmission device (1) according to claim 6, wherein the non-rotatable connection (26) between the first piston element (10) and the second piston element (12), opposite the connection element (22), is a stressing spring unit (27).

8. The power transmission device (1) according to claim 1, wherein the second piston element (12) is supported in an axial direction on a connection element (22) of the piston element (10).

9. The power transmission device (1) according to claim 8, wherein the first piston element (10) is guided on the input (E) of the power transmission device (1) and/or an element connected non-rotatably with input in a pressure-and-liquid tight manner.

10. The power transmission device (1) according to claim 8, wherein the connection element (22) is formed by the input (E) of the power transmission device (1) or an element connected non-rotatably with the input (E).

11. The power transmission device (1) according to claim 10, wherein the element connected non-rotatably with the input (E) is formed by a hub (20).

12. The power transmission device (1) according to claim 10, wherein means for bearing axial force are provided on the connection element (22), comprising at least a spring ring (29).

13. The power transmission device (1) according to claim 8, wherein the first piston element (10) is guided in a pressure-and-liquid tight manner on the input (E) and output (A) of the power transmission device (1) and/or an element connected non-rotatably with the input or output, and the connection element (22) is formed by the output (A) of the power transmission device (1) or an element connected non-rotatably with the output (A) of the power transmission device (1).

14. The power transmission device (1) according to claim 13, wherein means for bearing axial force are provided on the connection element (22), comprising an axial bearing device (35).

15. The power transmission device (1) according to claim 1, wherein the power transmission device (1) is executed as a triple channel unit, comprising a first connection (16) for coupling with a work chamber of the power transmission device, a second connection (17) for coupling an internal chamber (14) enclosed by a housing (13) and a third connection (18) for coupling with a chamber (11) that can be pressurized with hydraulic medium, said chamber (11) is part of the shiftable clutch device (6), wherein the second connection (17) converges around an axial interstice (30) between the first piston element and the second piston element (12), acting as a centrifugal-oil piston.

16. The power transmission device (1) according to claim 1, wherein the hydrodynamic component (3) is a hydrodynamic circulation rate torque converter (4).

17. The power transmission device (1) according to claim 1, wherein the hydrodynamic component (3) is a hydrodynamic clutch converter.

18. A power transmission device for power transmission between an engine and a power output, comprising:
  an input;
  an output;
  a hydrodynamic component (3);
  a shiftable clutch device, for at least partially bypassing said hydrodynamic component, including:
    a first piston element axially displaceable to open and close the shiftable clutch device; and,
    a second rotatable piston element disposed in an axial direction between said piston element and the hydrodynamic component and connected to the first piston element such that rotation of the second piston element is locked to rotation of the first piston element, wherein, the second piston element remains free of contact with the first piston at all times.

* * * * *